US005226278A

United States Patent [19]

Meylan et al.

[11] Patent Number: 5,226,278

[45] Date of Patent: Jul. 13, 1993

[54] GAS TURBINE COMBUSTION CHAMBER WITH IMPROVED AIR FLOW

[75] Inventors: Pierre Meylan, Neuenhof; Hans Schwarz, Umiken, both of Switzerland; Helmar Wunderle, Waldshut-Tiengen, Fed. Rep. of Germany

[73] Assignee: Asea Brown Boveri Ltd., Baden, Switzerland

[21] Appl. No.: 799,316

[22] Filed: Nov. 27, 1991

[30] Foreign Application Priority Data

Dec. 5, 1990 [EP] European Pat. Off. ........ 90123311.4

[51] Int. Cl.[5] ........................... F02C 3/00; F23R 3/06

[52] U.S. Cl. ........................................ 60/755; 60/752

[58] Field of Search ...................................... 60/34-36, 60/755, 756, 757, 752

[56] References Cited

U.S. PATENT DOCUMENTS

| | | | |
|---|---|---|---|
| 2,647,369 | 8/1953 | Leduc | 60/39.36 |
| 2,918,793 | 12/1959 | Jerie et al. | 60/755 |
| 3,420,058 | 1/1969 | Howald et al. | 60/757 |
| 3,422,620 | 1/1969 | Fantozzi et al. | |
| 3,978,662 | 9/1976 | DuBell | |
| 4,077,205 | 3/1978 | Pane et al. | |
| 4,773,227 | 9/1988 | Chabis | |
| 4,996,838 | 3/1991 | Melconian | 60/39.36 |

FOREIGN PATENT DOCUMENTS

| | | |
|---|---|---|
| 642257 | 8/1950 | United Kingdom |
| 1099374 | 1/1968 | United Kingdom |
| 2102558 | 2/1983 | United Kingdom |

*Primary Examiner*—Richard A. Bertsch
*Assistant Examiner*—Timothy S. Thorpe
*Attorney, Agent, or Firm*—Oblon, Spivak, McClelland, Maier & Neustadt

[57] ABSTRACT

In a gas turbine combustion chamber with an annular flame tube, the latter is essentially composed of wall pieces (18) which overlap in the circumferential direction. The wall pieces (18) are elements, curved in the turbine axial direction, the cooling air being directed in a circumferential direction along the external sides thereof facing towards the collector volume (6). The cooling air flowing out of the overlap gaps (22) is deflected in a cascade (29) before entry into the combustion volume (15).

5 Claims, 5 Drawing Sheets

GAS TURBINE COMBUSTION CHAMBER WITH IMPROVED AIR FLOW

BACKGROUND OF THE INVENTION

1. Field of the Invention

The invention concerns a gas turbine combustion chamber with an annular flame tube which bounds a combustion volume and whose side facing away from the combustion space is exposed to an airflow delivered by the compressor of the gas turbine, and which is essentially composed of overlapping wall pieces, in which the wall pieces, on their sides facing away from the combustion volume, each exhibit a number of inlet openings distributed around the circumference, by means of which openings the cooling air is fed into a distribution volume situated in the flame tube and communicating with the combustion volume.

2. Discussion of Background

Gas turbines with air-cooled flame tubes of this kind are known, for example, from U.S. Pat. No. 4,077,205 or U.S. Pat. No. 3,978,662. These show and describe cooling systems for flame tubes which are constructed from wall pieces overlapping in the turbine axial direction. The particular flame tube exhibits a lip, which extends over the slot through which the cooling air film exits. This cooling air film has to remain attached to the wall of the flame tube in order that it may form a protective cooling layer for the latter.

SUMMARY OF THE INVENTION

Accordingly, one object of this invention is to provide a novel means of minimizing the cooling air consumption of a gas turbine combustion chamber of the type described in the introduction, in order to reduce the production of $NO_x$.

In accordance with the invention, this is achieved in that the wall pieces are elements, curved in the turbine axial direction, which overlap each other in the circumferential direction and are provided with means to direct the cooling air at least approximately in the circumferential direction from the distribution volume situated at the inlet end of the wall piece to the outlet end of the wall piece.

Among other advantages of the invention, it can be seen that the new measure permits efficient impingement/convection cooling with a minimum number of gaps so that cooling air losses are kept under control.

It is particularly expedient for the longitudinal sides of the wall pieces extending in the turbine axial direction to run parallel to the turbine axis and for the flame tube to exhibit an even number of overlapping wall pieces. In the case of an axially divided type of construction, the overlap locations can be used to provide a split line, and assembly means can be provided to constrain the positions of the wall pieces.

Furthermore, it is advantageous for the cooling air flowing out of the overlap gaps between two adjacent wall pieces to be deflected in a cascade before entry into the combustion volume. The angle of incidence of the cascade can be increasingly modified from flame tube entry to flame tube exit to agree with the swirling flow of the combustion gases in the vicinity of the wall.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein, for a single-shaft axial flow gas turbine.

Only those elements essential for understanding the invention are shown. Those components of the facility not shown include, for example, the exhaust gas casing of the gas turbine, with exhaust gas duct and chimney, and the inlet sections of the compressor. The flow direction of the working medium is denoted by arrows.

DESCRIPTION OF THE PREFERRED EMBODIMENTS

Figure 1:
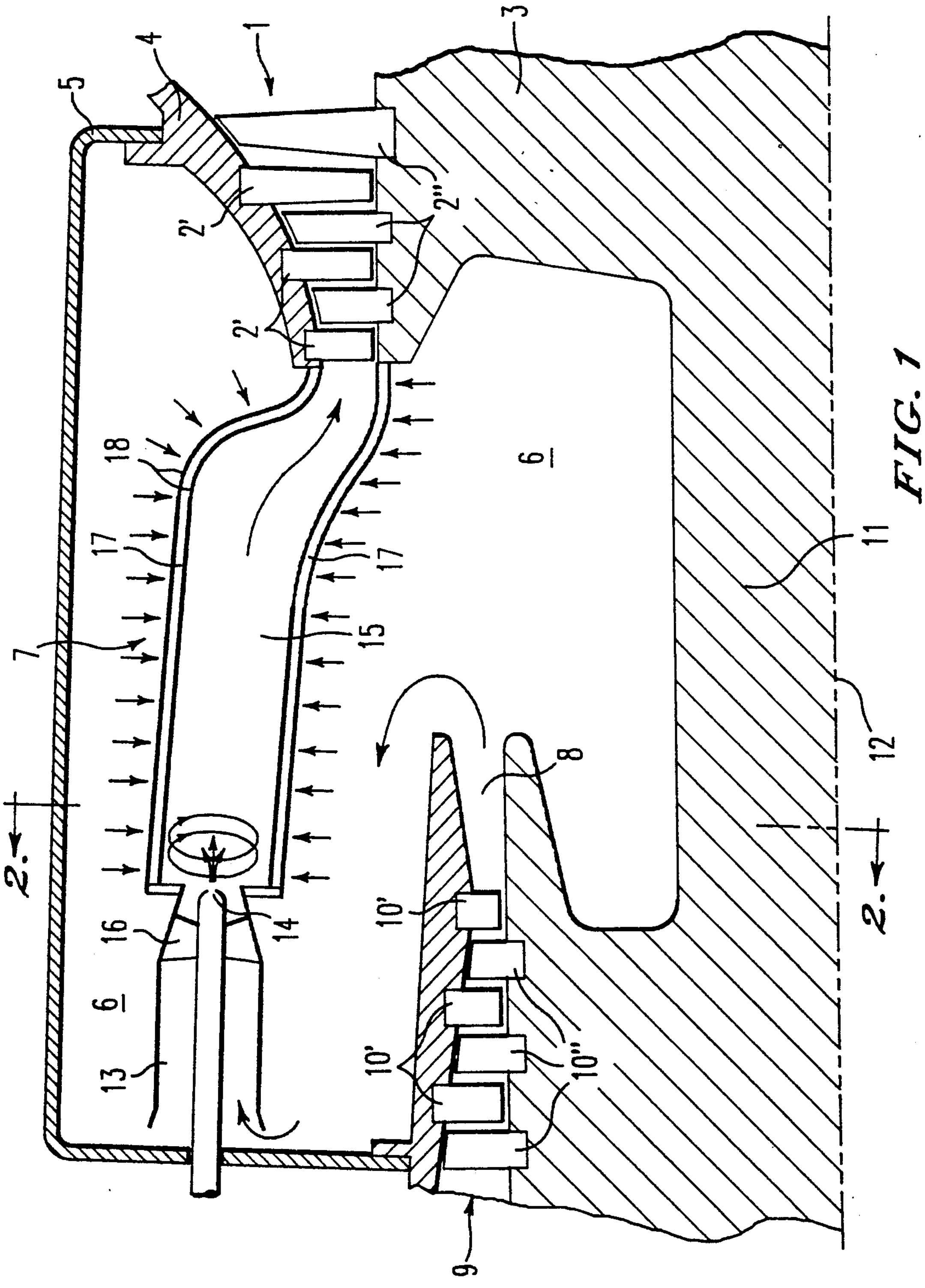
FIG. 1 shows a longitudinal cross-section of the gas turbine.

Referring now to the drawings, wherein like reference numerals and letters designate identical or corresponding parts throughout the several views, in FIG. 1, the turbine 1, represented by the first axial flow stages in the form of three guide vane rows 2′ and three rotor rows 2″, essentially comprises the bladed turbine rotor 3 and the vane carrier 4 fitted with guide vanes. The vane carrier is suspended inside the turbine casing 5. In the case shown, the turbine casing 5 also bounds the collector volume 6 for the compressed combustion air. From this collector volume the combustion air reaches the annular combustion chamber 7, which in turn opens into the turbine inlet, that is to say, upstream of the first guide vane row 2′. The compressed air reaches the collector volume from the diffuser 8 of the compressor 9. Only the three final stages of the latter are shown, in the form of three stator rows 10, and three rotor rows 10″. The rotor blading of the compressor and of the turbine sit on a common shaft 11, whose central axis represents the longitudinal axis 12 of the gas turbine unit.

The compressed combustion air enters the burner 13, only shown as an example, from the collector volume 6 in the direction of the arrow; 36 burners are distributed uniformly around the circumference. The fuel is sprayed into the combustion volume 15 by means of a fuel nozzle 14. In the primary air inlet plane, the fuel nozzle is surrounded by a swirler 16 in the form of swirl vanes. The air passes through the swirl vanes into the primary zone of the combustion volume 15, where the combustion process takes place. The swirl vanes produce a swirling flow with a core of air directed towards the burner; this air anchors the flame to the burner, so that it is not torn away in spite of the high air velocity. At the same time the turbulent flow ensures rapid combustion. During this combustion process, the combustion gases reach very high temperatures, which makes particular demands on the walls of the flame tube (17) which have to be cooled. This applies particularly where so-called low $NO_x$ burners, for example, pre-mixing burners, are used instead of the diffusion burner shown. These require large flame tube surface areas and relatively modest amounts of cooling air.

Figure 2:
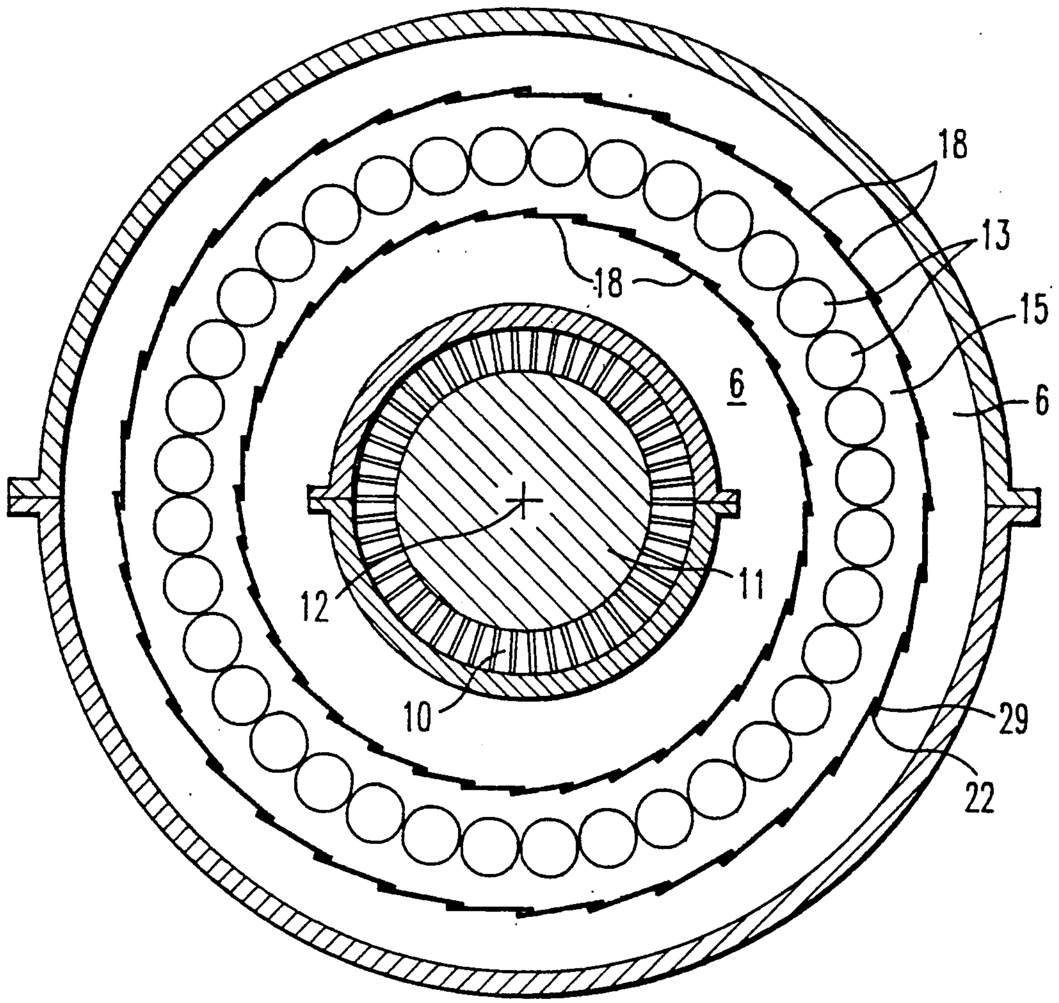
FIG. 2 shows a cross-section through the flame tube of the combustion chamber along line 2—2 in FIG. 1.
Figure 6:
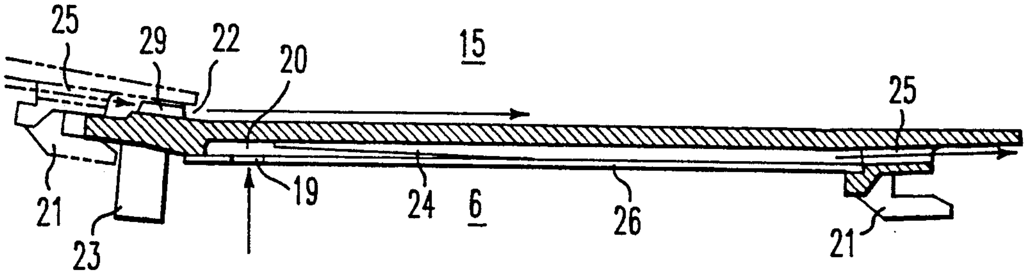
FIG. 6 shows a wall piece in cross-section along line 6—6 in FIG. 5.

Downstream of the burner outlets, the annular combustion volume 15 extends as far as the turbine inlet. It is bounded by the flame tube 17 both inside and outside. This flame tube is designed as a self-supporting structure in the present example. It comprises, in both its inner and outer rings, a number of longitudinally arranged wall pieces 18 with tangential overlap gaps 22 (FIG. 2 and 6). These wall pieces, which can be castings, are curved in the turbine axial direction corresponding to the course of the combustion volume through which flow is taking place and extend over the total axial length of the flame tube.

The longitudinal sides 31 (FIGS. 4 and 5) of the wall pieces 18, i.e. both the leading edges facing towards the collector volume 6 and the cooling air outlet edges facing towards the combustion volume 15 (FIG. 2) run parallel to the turbine axis 12. Since the turbine casing is usually split horizontally for the purpose of removing the single-piece shaft, it is appropriate to select an even number of wall pieces. By this means, in each case two locations where the wall pieces overlap and which are spaced 180° apart can be used as a split line. For reasons of symmetry, the number of wall pieces has here been chosen to be the same as the number of burners, i.e. 36 pieces (FIG. 2). It is obvious that this measure is in no way mandatory. Thus, for example, the number of wall pieces in the inner flame tube ring can be halved relative to that in the outer flame tube ring. Fundamentally, the number of wall pieces is determined by the requirement that the cooling air flowing out of the gaps into the combustion volume must be used as film cooling as efficiently as possible. This means that the distance between two cooling air gaps in each case, and therefore the tangential extent of a wall part, is approximately as large as the effective length of the cooling air film. Hence it is possible to recognize the advantage, from the manufacturing viewpoint inter alia, that only the number of gaps, or respectively wall pieces, actually necessary must be provided. In addition, this method of construction permits the production of annular flame tubes of any given dimensions and geometries. This type of construction is easy to maintain quite simply because, in the event of damage, only those wall pieces which are damaged have to be replaced.

As can be seen from the arrows surrounding the flame tube in FIG. 1, the flame tube is exposed, on its side facing away from the combustion volume, to the airflow delivered by the compressor 9 in the collector volume 6. On their sides facing towards the collector volume 6, the wall pieces exhibit a number of inlet openings distributed around the circumference (19 in FIG. 5 and 6). These lead the cooling air into a distribution volume (20 in FIG. 5 and 6), situated inside the wall piece and communicating with the combustion volume.

Figure 2A:
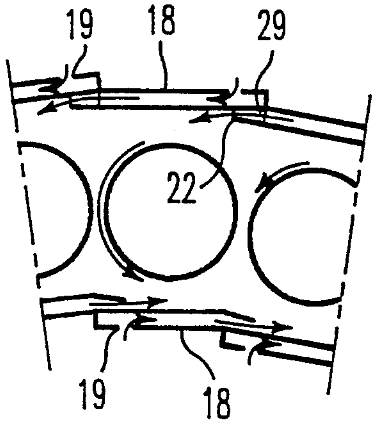
FIG. 2A shows an enlarged portion of FIG. 2.

The conduction of the cooling air on the wall pieces 18 is represented diagrammatically in FIG. 2A. With the aid of means described later, the cooling air is directed, as far as possible in the circumferential direction, along the surfaces of the wall pieces facing towards the collector volume 6. As the cooling air flows into the combustion volume 15 it must not be directed against the swirling flow of the combustion gases, as depicted by arrows. This means that the inlet flow openings and the exit flow gaps in the wall pieces of the flame-tube inner ring are configured so as to be exactly opposed to those in the flame-tube outer ring. Seen against the flow direction of the combustion gases, which in this view exhibit anticlockwise swirl, the cooling air therefore also flows through the outer ring in an anticlockwise direction, whereas it flows over the wall pieces of the inner ring in a clockwise direction.

An additional requirement applies at the outlet end of the wall piece where, for the purposes of maintaining the cooling film, the cooling air must be introduced into the combustion volume 15 in such a way that it agrees as far as possible with both the rotational and absolute direction of the flow of the combustion gases in the vicinity of the wall of the flame tube.

Figure 3:
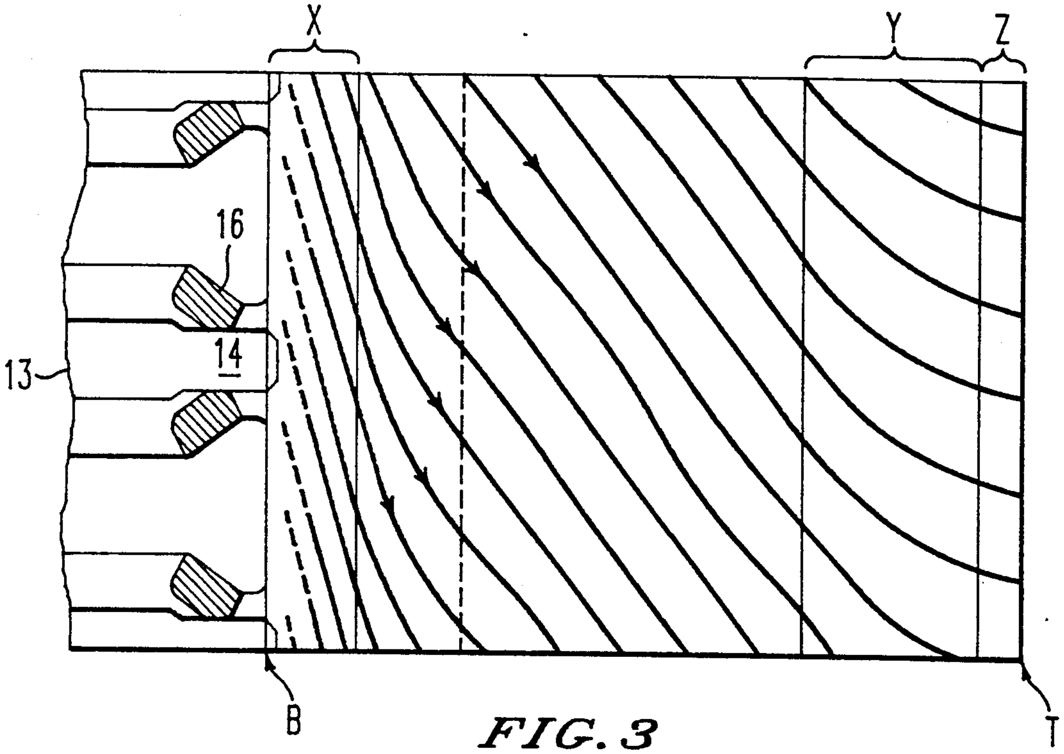
FIG. 3 shows the partial development of a cylindrical section through the flame tube level with the burner.

In this connection, reference is made to FIG. 3 in which the flow conditions in the combustion volume are represented by means of the partial development of a cylindrical section. In this FIG. 3, the vertical B denotes the plane of the burner outlet and the vertical T denotes the turbine entry plane. The flow in the combustion volume is illustrated using numerical data which, however, can only provide an example of the flow characteristics because there are many other parameters influencing the flow. The combustion air leaves the swirler at an angle of about 75°. An acceleration of the working medium takes place in the zone denoted by X because of the combustion reaction process and this leads to a slight deflection in the axial direction. From this point onwards, the combustion gases flow at an angle of about 55°. In the zone Y, the gas flow is accelerated in the axial direction and the flow passage becomes increasingly steep (FIG. 3). This contraction ahead of the turbine entry has the effect that the gases in the zone Z are deflected to an angle of about 20° at which they reach the guide vanes 2' of the first turbine stage.

From this swirl distribution, it can be seen that varying flow conditions over the axial length of the flame tube must be taken into account with respect to the entry of the cooling air into the combustion volume. The direction of the cooling air, up to this point flowing along the wall facing towards the collector volume in an essentially tangential direction, must therefore be matched to the relevant direction of the main flow prevailing in the vicinity of the wall. This is achieved by means, described later, located inside the gap formed in the overlap region between two adjacent wall pieces.

Figure 4:
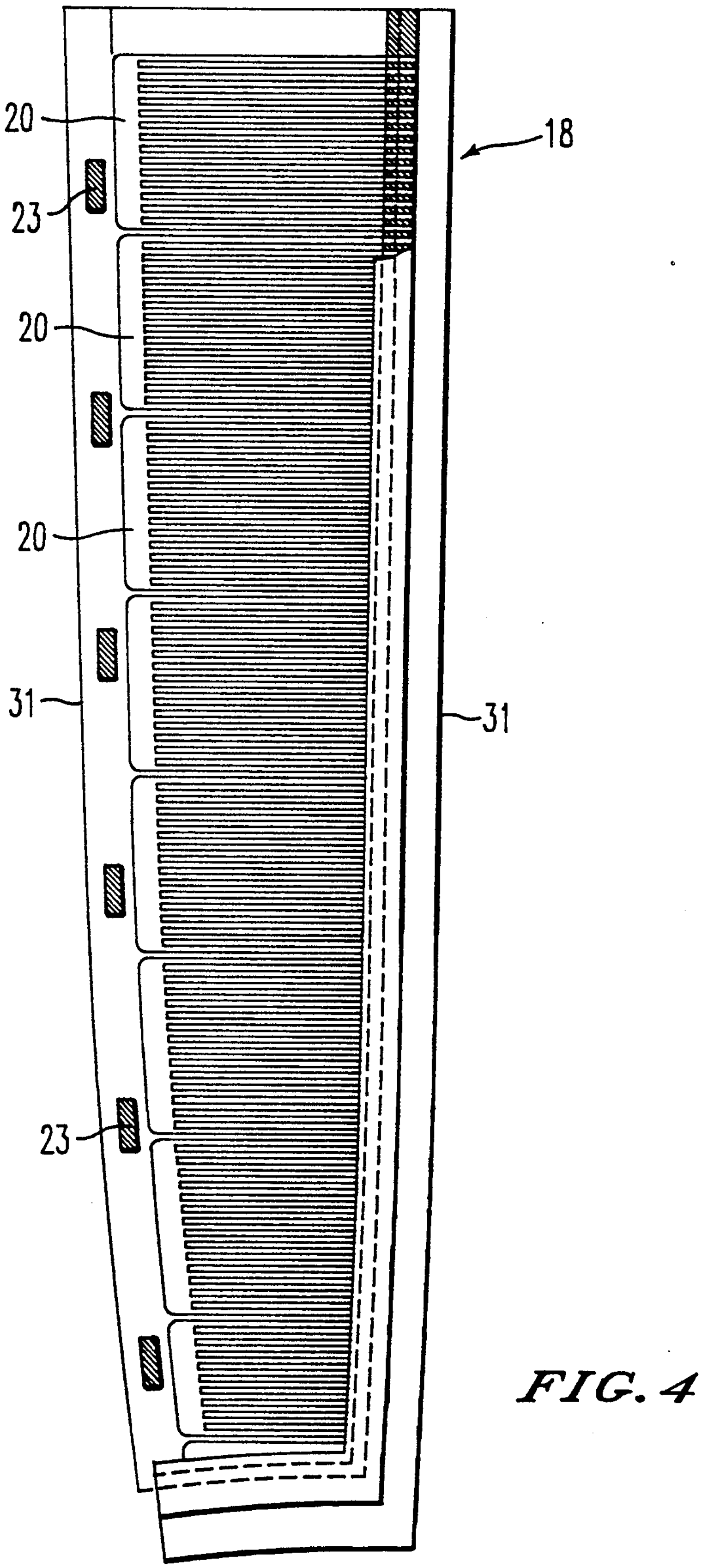
FIG. 4 shows a wall piece of the flame tube.
Figure 5:
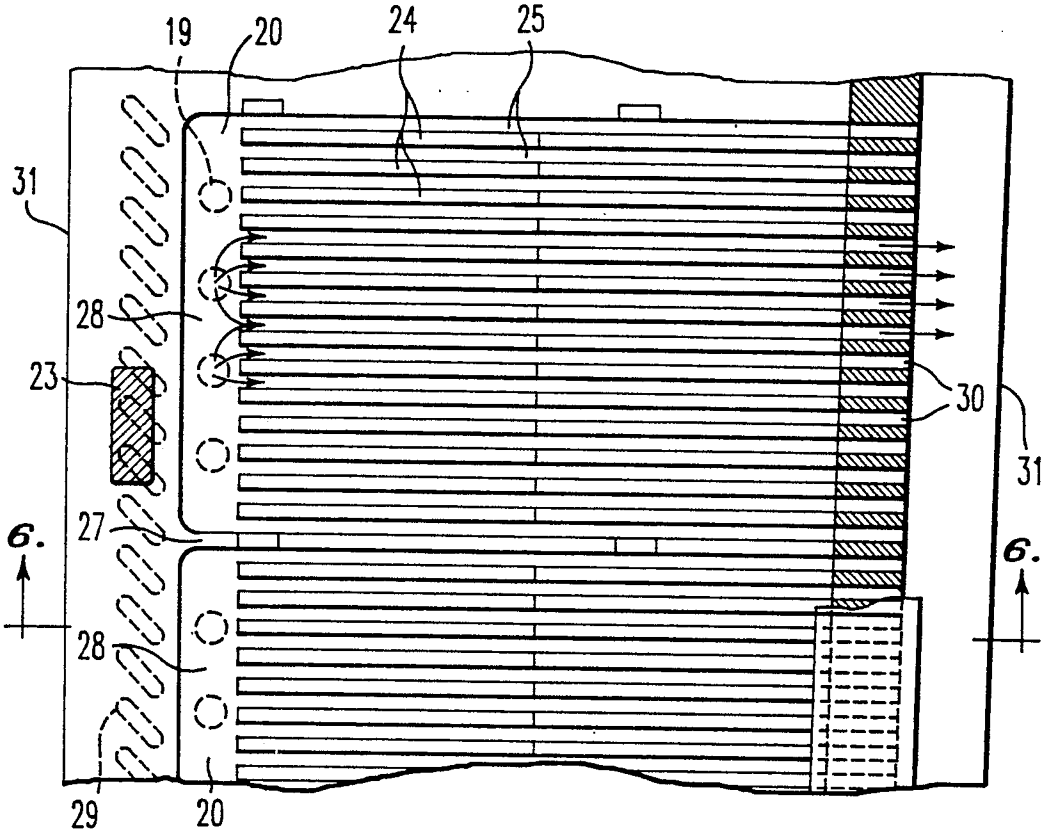
FIG. 5 shows an enlarged section of the wall piece in accordance with FIG. 4.

FIG. 4 and 5 show, in plan view, the structure of a wall piece 18 and, in particular, the side facing towards the collector volume. FIG. 6 represents a wall piece of the inner flame tube ring in cross-section. In actual fact, the wall pieces are plates that are almost flat, curved in the turbine longitudinal direction corresponding to the course of the combustion volume, in accordance with FIG. 1. On their side facing towards the collector volume, these plates are provided at one end with a holding device in the form of a gripper 21. The respectively circumferentially adjacent plate is held by this gripper 21, as shown by the dashed outline at the left-hand end of the plate. In this manner a simple means of assembly is achieved, which furthermore enables the overlap gap 22 to be maintained within narrow limits under all operating conditions. A lug 23 is provided at the other end of the plate, which can be used for purposes of securing the flame tube. In the case shown, the flame tube structure is self-supporting; it is obvious that this is only possible up to a certain order of size. The lugs 23 on the wall pieces can of course be connected to actual load-carrying structures. These must always be designed such that free expansion of the wall pieces is not prevented during operation.

The wall pieces are fitted with longitudinal ribs 24 on their side facing away from the combustion volume. These extend from the inlet side distribution volume 20 as far as outlet side passages 30. These passages can be designed as holes through a land carrying the grippers 21. The longitudinal ribs 24 subdivide the side of the wall piece facing away from the combustion volume 15 into channels 25, through which the cooling air is led to the passages 30 in the circumferential direction. The distribution volume 20 and the ribs 24 and channels 25 are all separated from the collector volume 6 by a cover 26. In this cover there are, in the plane of the distribution volume 20, a number of inlet openings 19 for the cooling air. These openings 19 are also outlined in dashed line form as holes in FIG. 5, although they are invisible in this view, since for reasons of clarity the cover has been omitted in FIG. 4 and 5. In these figures it can also be seen that the distribution volume 20 at the inlet end of the wall piece is subdivided by means of separating walls 27 into a plurality of distribution segments 28. Selection of the axial extent of these distribution segments, and hence of the number of the impinged channels 25 per segment, and selection of the size of the inlet openings 19 provides a simple means for exact metering of the cooling air.

The cooling air flowing out of the passages 30 into the overlap gap 22 is deflected in a cascade or deflecting gate 29 before entry into the combustion volume 15. The cascade is situated at the inlet end of the adjacent overlapped wall piece (FIG. 6), on the side thereof facing towards the combustion volume. The angle of incidence of the cascade is increasingly modified from flame tube inlet to flame tube outlet to agree with the swirling flow of the combustion gases prevailing in the vicinity of the wall.

The invention is not, of course, confined to the embodiment shown and described. Thus, for example, the longitudinal sides of the wall pieces, instead of running parallel to the turbine axis, could run just as well in a helical configuration, at 45°, for example. As a departure from the integral method of construction of the deflection cascade shown, this cascade could just as well be designed as a separate unit. Moreover, the ribs are installed over only part of the walls instead of over their complete axial length, unless absolutely necessary for cooling purposes. It is also conceivable that in place of the longitudinal ribs, the surface of the wall piece could be grooved, either with or without a turbulence cascade.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A gas turbine combustion chamber having an annular flame tube which bounds a combustion volume and having a side facing away from the combustion volume which is exposed to an airflow delivered by a compressor of the gas turbine, and which is essentially composed of overlapping wall pieces;

wherein the wall pieces, on sides facing away from the combustion volume, each exhibit a number of inlet openings distributed around the circumference, by means of which openings the cooling air is fed into distribution volumes situated in the wall pieces and communicating with the combustion volume; and wherein the wall pieces are elements, curved in the turbine axial direction, which overlap each other in the circumferential direction and are provided with means to direct the cooling air at least approximately in the circumferential direction from the distribution volumes situated at inlet ends of the wall pieces to outlet ends of the wall pieces;

wherein the means to direct the cooling air includes ribs which subdivide a side of a wall piece facing away from the combustion volume into channels, which in turn are separated from the volume of air outside the flame tube by a cover; and wherein the cooling air flowing out of the ribs is deflected by a deflecting gate before entry into the combustion volume, which deflection gate is situated at the inlet end of an adjacent overlapped wall piece on a side thereof facing towards the combustion volume.

2. The gas turbine combustion chamber as claimed in claim 1, wherein the distribution volume at the inlet end of the wall piece is subdivided by means of separating walls into a plurality of distribution segments.

3. The gas turbine combustion chamber as claimed in claim 1, wherein the longitudinal sides of the wall pieces extending in the turbine axial direction run parallel to the turbine axis.

4. The gas turbine combustion chamber as claimed in claim 1, wherein the overlapping wall pieces form a self-supporting flame tube structure.

5. The gas turbine combustion chamber as claimed in claim 1, wherein the flame tube includes an even number of overlapping wall pieces.

* * * * *